United States Patent [19]
Cooper

[11] Patent Number: 5,194,775
[45] Date of Patent: Mar. 16, 1993

[54] ELECTRIC MOTOR STATOR TABS

[75] Inventor: Charles R. Cooper, Unicoi, Tenn.

[73] Assignee: Morrill Electric, Inc., Erwin, Tenn.

[21] Appl. No.: 848,701

[22] Filed: Mar. 9, 1992

[51] Int. Cl.$^5$ .............................................. H02K 3/46
[52] U.S. Cl. ...................................... 310/260; 310/71; 310/216
[58] Field of Search ................. 310/260, 270, 194, 91, 310/217, 216, 214, 42, 71, 254, 218

[56] References Cited

U.S. PATENT DOCUMENTS

| | | | |
|---|---|---|---|
| 565,931 | 8/1996 | Short | 310/260 |
| 2,810,848 | 10/1957 | Roberts | 310/260 |
| 2,835,453 | 5/1958 | Young, Jr. | 310/260 X |
| 3,861,026 | 1/1975 | Swaim | 310/260 |
| 4,371,802 | 12/1982 | Morrill . | |
| 4,649,305 | 3/1987 | Morrill . | |
| 4,864,176 | 9/1989 | Miller et al. . | |
| 4,959,578 | 9/1990 | Varga | 310/268 |

FOREIGN PATENT DOCUMENTS

| | | | |
|---|---|---|---|
| 0482506 | 9/1939 | Fed. Rep. of Germany | 310/260 |
| 3604939 | 8/1987 | Fed. Rep. of Germany | 310/260 |
| 0398768 | 3/1966 | Switzerland | 310/260 |

*Primary Examiner*—R. Skudy
*Attorney, Agent, or Firm*—George Pappas

[57] ABSTRACT

An electric motor having a circular stator with angularly spaced, radially inwardly extending teeth that define winding slots therebetween. The teeth inner ends define a bore whereat the motor rotor is located. The stator is made of a plurality of bound laminations of magnetically permeable material. The end lamination includes tab portions between the stator teeth which are punched out of the same stock material during the punching process and which are, thereafter, bent to extend away from the stator. The bent tab portion provided a resting ledge whereat wire extending between the coils on the stator teeth extends over and is retained away from the rotating rotor. The tabs further aid in properly locating the wire from coil to coil during the winding process. The tab portions have a rounded, semi-circular end part to prevent the snagging and possible damage of the wire during the initial winding process.

13 Claims, 3 Drawing Sheets

ELECTRIC MOTOR STATOR TABS

TECHNICAL FIELD

The present invention relates to the technical field of electric motors utilizing a stator core made of a plurality of bound laminations. More specifically, the present invention relates to the construction of the laminated stator core so that wire extending between coils located on stator teeth can be retained away from the rotor.

BACKGROUND OF THE INVENTION

Stator cores are commonly now made of bound laminations which are punched or stamped out of flat magnetically permeable stock materials. The laminated stator cores of, for example, shaded pole and half-pitch capacitor induction motors include a plurality of teeth extending inwardly from a yoke portion and defining a bore whereat a rotor is received. For example, Morrill, U.S. Pat. Nos. 4,371,802 and 4,649,305 show a stator core of a half-pitch capacitor induction motor wherein coils of wire are wrapped around the stator teeth. These coils are excited in a known and customary manner and provide the necessary flux for driving the rotor.

Each of the stator core coils are normally wound by an automatic winding machine with a proper size and type of wire. So as to retain the wire away from the rotor and to extend from one coil to the next, Morrill, U.S. Pat. No. 4,649,305 shows the use of a pin whereover the wire is passed. The pin shown therein appears above each stator tooth and wire extending to and from the coils extends thereover. This pin is apparently mechanically fastened or otherwise placed on the stator core member. Such placement of a pin, however, would require an additional manufacturing step thereby increasing time and material costs and, thereby, increasing the overall cost of the motor.

Accordingly, a need exists for a stator core having the capabilities of retaining the wire away from the rotor as the wire extends from coil to coil and which is less time-consuming and less costly to manufacture.

SUMMARY OF THE INVENTION

It is the principal object of the present invention to overcome the above-discussed disadvantages associated with prior stator cores.

The present invention overcomes the disadvantages associated with prior stator cores by stamping or punching an end stator lamination that includes tab portions. The tabs which initially are in the same plane as the lamination are bent to extend away from the stator thereby providing a resting ledge whereat the wire extending from coil to coil may rest.

The tabs are preferably located between the stator coil teeth so that the wire exiting one coil can more easily be directed thereover and to a next succeeding coil. The tab portion as initially punched has a rounded semi-circular end part for preventing potential snagging of the wire during the winding operation.

In one form thereof, the present invention is directed to an electric motor including a circular stator core having a plurality of angularly spaced radially inwardly extending teeth defining winding slots therebetween. The teeth have inner ends defining a bore and a plurality of wire coils are wrapped on the teeth. A rotor member is located in the bore. The stator is made of a plurality of bound laminations including an end lamination. The end lamination includes a tab portion bent to extend away from the stator. The wire extending between the coils extends over the tab portion and is retained away from the rotor.

In one form thereof, the present invention is directed to an electric motor including a circular stator core having a plurality of angularly spaced, radially inwardly extending teeth defining winding slots therebetween. The teeth have inner ends defining a bore and a plurality of wire coils are wrapped on the teeth. A rotor member is located in the bore. The stator is made of a plurality of bound laminations including an end lamination, and the end lamination includes a tab portion located between two stator teeth. The tab portion is bent to extend away from the stator and, also, is shaped having a rounded, semi-circular end part. The wire extending between the coils extends over the tab portion and is retained away from the rotor.

BRIEF DESCRIPTION OF THE DRAWINGS

The above-mentioned and other features and objects of this invention and the manner of obtaining them will become more apparent and the invention itself will be better understood by reference to the following description of embodiments of the invention, taken in conjunction with the accompanying drawings wherein.

Corresponding reference characters indicate corresponding parts throughout the several views of the drawings.

Figure 1:
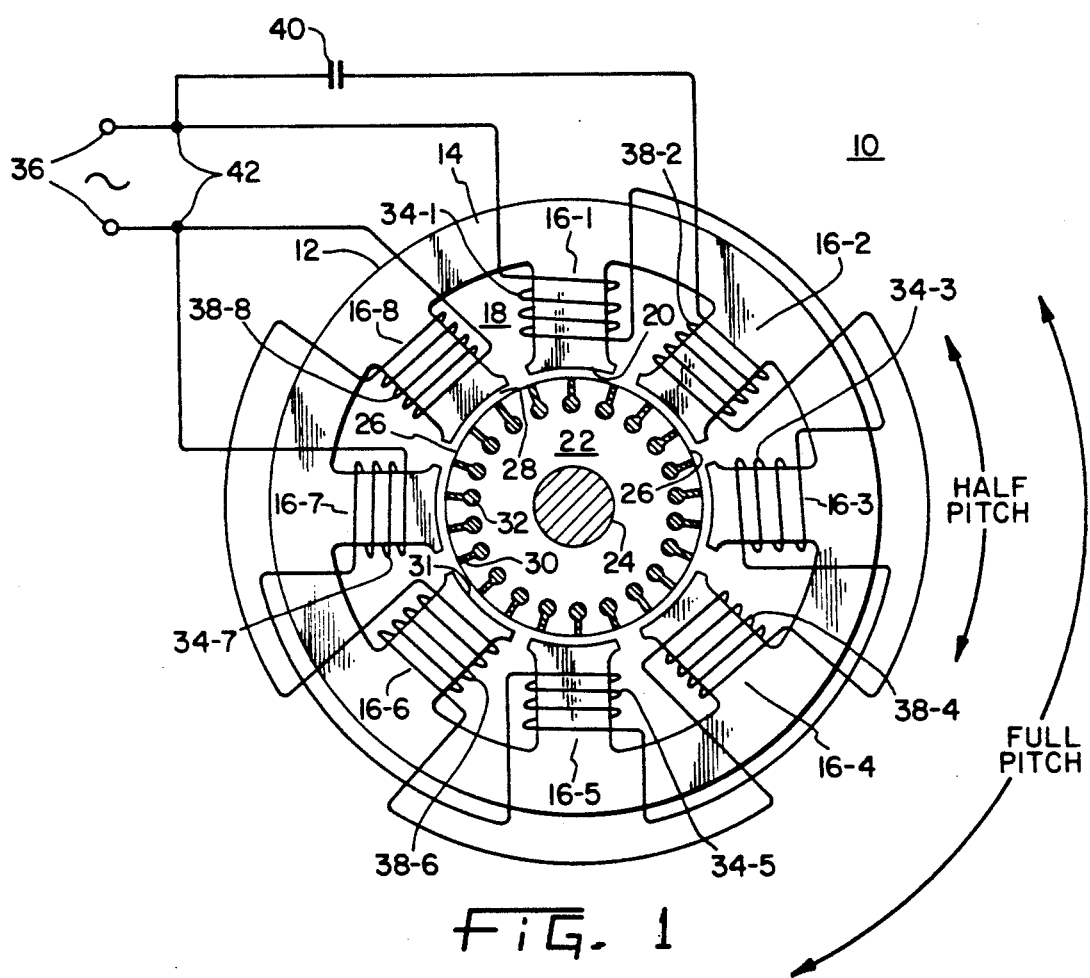
FIG. 1 is a diagrammatic cross-sectional view of an electric motor showing the stator teeth along with the main and auxiliary coils.
Figure 2:
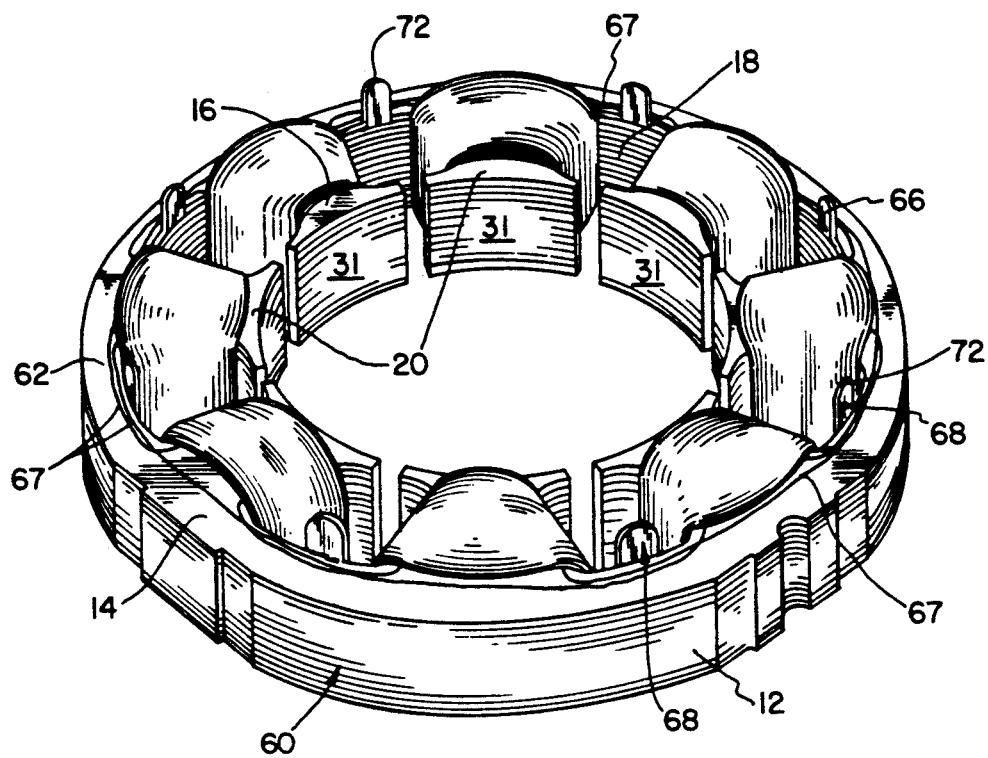
FIG. 2 is a perspective view of a laminated stator core including an end lamination according to the present invention.
Figure 3:
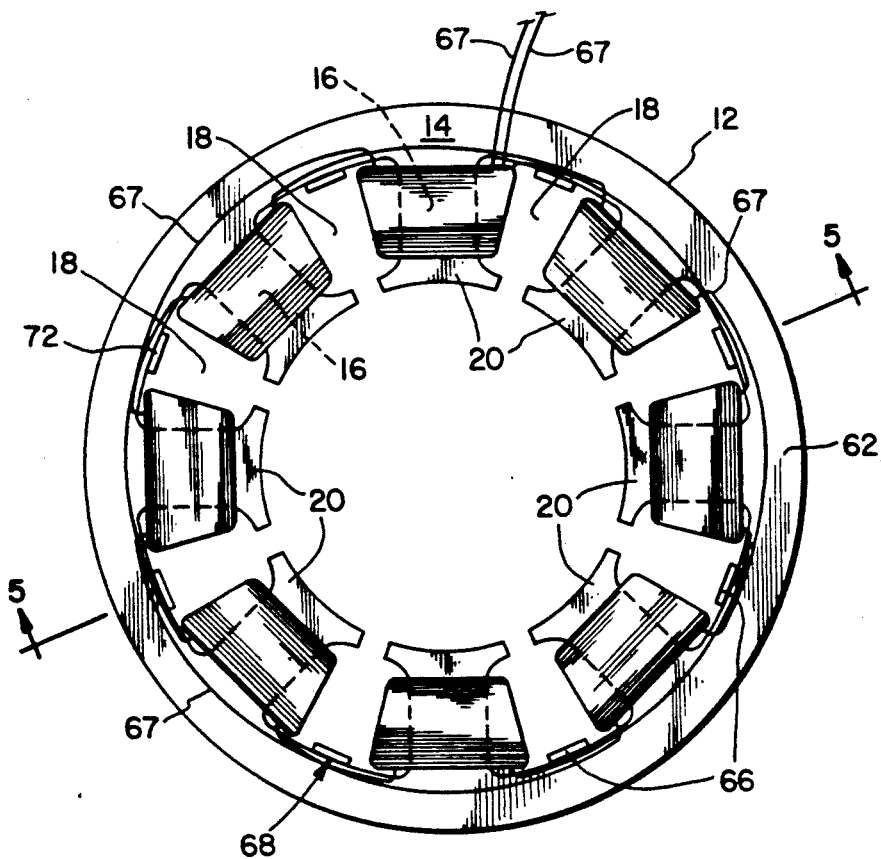
FIG. 3 is a top plan view of the stator core shown in FIG. 2.
Figure 4:
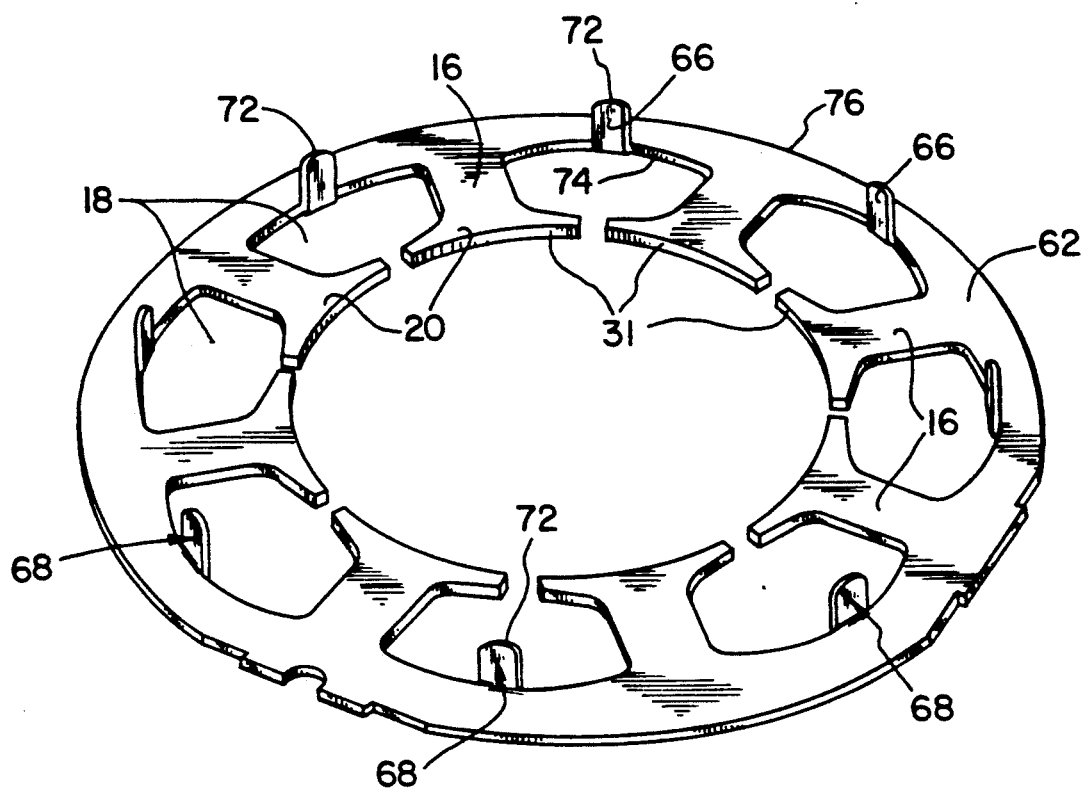
FIG. 4 is a perspective view of an end lamination with bent tab portions according to the present invention; and, FIG. 5 is a cross-sectional view of the stator core taken along line 5—5 of FIG. 3.
Figure 5:
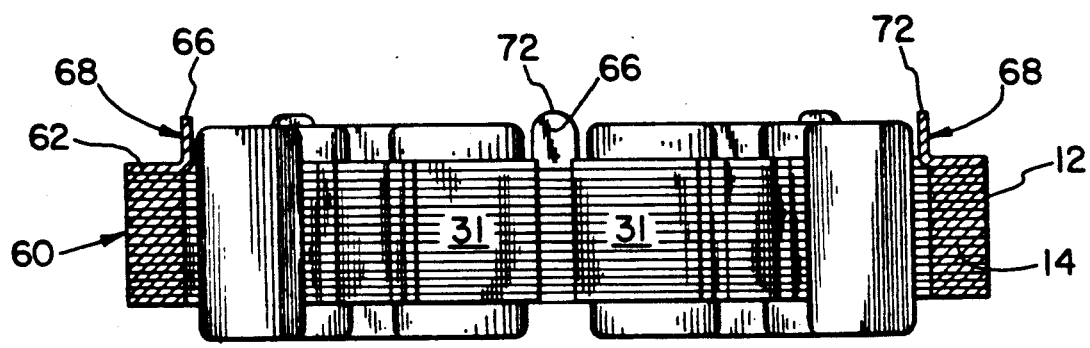

The exemplifications set out herein illustrate preferred embodiments of the invention in one form thereof and such exemplifications are not to be construed as limiting the scope of the disclosure or the scope of the invention in any manner.

DETAILED DESCRIPTION OF THE PREFERRED EMBODIMENT

Referring to the figures of the drawings, there is shown an asynchronous induction motor generally indicated as 10 and having a laminated stator core member 12. Stator core member 12 includes a generally cylindrically-shaped yoke portion 14 and equally angularly spaced radially inwardly extending teeth 16 respectively defining winding slots 18 therebetween. Teeth 16 have inner ends 20 which define a bore for receiving laminated rotor member 22 on shaft 24. Outer periphery 26 of rotor member 22 defines radial air gaps 28 with inner ends 20 of stator teeth 16. Outer periphery 26 also has generally axially extending slots 30 formed therein for a squirrel cage winding 32 therein in a known and customary fashion. The number of stator teeth 16 is twice the number of poles of motor 10 and, thus, in the embodiment shown in the figures, there are four poles and a total of eight stator teeth 16. The inner ends 20 of teeth 16 have substantially equal angular extent. That is, the pole face 31 of each tooth 16 embraces outer periphery 26 of rotor member 22 with the same span as every other tooth.

Similar to the half-pitch capacitor induction motor disclosed in U.S. Pat. No. 4,371,802 to Wayne J. Morrill, the full text and teachings of which are expressly incorporated herein by reference, a main field winding is provided including serially connected coils 34-1, 34-3, 34-5, and 34-7 respectively embracing teeth 16-1, 16-3, 16-5, and 16-7. There are the same number of coils as the number of poles. The main field winding coils 34-1, 34-3, 34-5, and 34-7 are serially connected across single-phase alternating current source 36 such as 120 volts, 60 Hz.

An auxiliary field winding is provided and includes coils 38-2, 38-4, 38-6 and 38-8 respectively embracing consecutive alternate teeth 16-2, 16-4, 16-6, and 16-8 intermediate the teeth upon which the main winding coils 34 are wound. Auxiliary field winding coils 38-2, 38-4, 38-6, and 38-8 are serially connected with phase shifting capacitor 40 across the serially connected main field winding coils 34 as indicated at 42. As indicated in FIG. 1, full pitch is the angular extent of one pole of motor 10, i.e., 90 degrees mechanical in the illustrated four pole embodiment, and half-pitch is the angular extent of one-half of one pole i.e., 45 degrees mechanical in the illustrated four pole embodiment. The magnetic flux crossing air gap 28 into or out of respective teeth ends 20 has a substantially half-pitch span.

As shown, the stator core 12 is made of a plurality of bound laminations 60 including an end lamination 62. The laminations are bound together in a known and customary manner. Each of the laminations 60 and 62 are stamped from flat stock of magnetically permeable material prior to being assembled together.

So as to decrease production costs and provide a longer lasting superior motor, the end lamination 62 includes a plurality of tabs 66 whereby wire 67 extending between coils 34-1, 34-3, 34-5, and 34-7 and 38-2, 38-4, 38-6, and 38-8 is placed thereover and is thereby retained away from the rotor 22. Tabs 66 are stamped out along with the end lamination piece 62 and, thereafter, are bent at an angle extending away from the stator 12 as shown for providing a resting ledge 68 whereat the wire 67 rests.

Preferably, a single tab is provided between each of said coils 34. However, depending on the mechanical placement of each of said teeth 16 and the size of coils 34, two or more tabs 66 can be provided between successive teeth 16. In addition, preferably, tabs 66 are bent in a plane substantially perpendicular to that of end lamination 62 for providing an effective resting ledge 68. However, depending on the wire traveling angle leading to or away from said coils 34 and 38, tabs 66 may be bent at an obtuse or acute angle from the end lamination 62 as originally stamped.

Each of tabs 66 are rounded with a semi-circular end part 72 as shown in the drawings. In this fashion, the potential for snagging and possibly damaging the wire as it is being wound on teeth 16 during production is decreased and, again, production costs are thereby decreased.

It is also noted that tabs 66 can be located not only on the edges 74 of the end laminations 62 but, also, on the outer periphery edge 76. It is also contemplated that such tabs can be stamped out, for example, from the stator core 62 center area as needed. Further yet, depending on the winding process and wire 67 location, two end laminations 60 can be used, one on each side of stator core 12. In such an embodiment, tabs 66 retain wire away from rotor 22 on both sides of stator 12.

While the invention has been described as having specific embodiments, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. An electric motor comprising:
    a circular stator having a plurality of angularly spaced radially inwardly extending teeth defining winding slots therebetween, said teeth having inner ends defining a bore and a plurality of wire coils wrapped on said teeth;
    a rotor in said bore;
    said stator made of a plurality of bound laminations including an end lamination;
    said end lamination including a tab bent to extend away from said stator; and,
    wherein wire extending between said coils extends over said tab and is retained away from said rotor.

2. The electric motor of claim 1 wherein said tab is located between two teeth.

3. The electric motor of claim 2 further comprising a second tab between said two teeth, and wherein wire extending between said coils extends over both of said tabs and is retained away from said rotor.

4. The electric motor of claim 1 wherein said end lamination includes a tab located between each of said teeth, each of said tabs being bent to extend away from said stator and wherein wire extending between said coils extends over said tabs and is retained away from said rotor.

5. The electric motor of claim 4 wherein said tabs are bent in a plane substantially perpendicular to that of the lamination.

6. The electric motor of claim 1 wherein said tab is bent in a plane substantially perpendicular to that of the lamination.

7. The electric motor of claim 1 wherein said tab has a rounded semi-circular end part.

8. The electric motor of claim 1 wherein said tab is bent at an obtuse angle from the end lamination.

9. The electric motor of claim 1 wherein said tab is bent at an acute angle from said end lamination.

10. An electric motor comprising:
    a circular stator having a plurality of angularly spaced, radially inwardly extending teeth defining winding slots therebetween, said teeth having inner ends defining a bore and a plurality of wire coils wrapped on said teeth;
    a rotor in said bore;
    said stator made of a plurality of bound laminations including an end lamination;
    said end lamination including a tab between two of said teeth, said tab being bent to extend away from said stator and being shaped having a rounded semi-circular end part; and,
    wherein wire extending between said coils extends over said tab and is retained away from said rotor.

11. The electric motor of claim 10 further comprising a second tab between said two teeth and wherein wire extending between said coils extends over both of said tabs and is retained away from said rotor.

12. The electric motor of claim 10 wherein said end lamination includes plurality of tabs, one of said tabs located between each of said teeth, each of said tabs being bent to extend away from said stator and wherein wire extending between said coils extends over said tabs and is retained away from said rotor.

13. The electric motor of claim 12 wherein said tabs are bent in a plane substantially perpendicular to that of the lamination.

* * * * *